United States Patent
Yamazaki

(10) Patent No.: US 8,088,038 B2
(45) Date of Patent: Jan. 3, 2012

(54) CONTROL DEVICE OF A VEHICLE, CONTROL METHOD AND RECORDING MEDIUM BEARING A PROGRAM IMPLEMENTING THE METHOD

(75) Inventor: Makoto Yamazaki, Gotenba (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 440 days.

(21) Appl. No.: 12/514,833

(22) PCT Filed: Dec. 17, 2007

(86) PCT No.: PCT/JP2007/074622
§ 371 (c)(1),
(2), (4) Date: May 14, 2009

(87) PCT Pub. No.: WO2008/099566
PCT Pub. Date: Aug. 21, 2008

(65) Prior Publication Data
US 2010/0069197 A1    Mar. 18, 2010

(30) Foreign Application Priority Data

Feb. 13, 2007   (JP) ................. 2007-032193

(51) Int. Cl.
*B60W 10/04* (2006.01)
*G06F 7/00* (2006.01)
*B60K 1/02* (2006.01)

(52) U.S. Cl. ............................... 477/111; 701/52; 477/3

(58) Field of Classification Search .............. 477/3, 107, 477/111; 180/65.28; 701/52
See application file for complete search history.

(56) References Cited

U.S. PATENT DOCUMENTS

| | | | |
|---|---|---|---|
| 5,050,453 A * | 9/1991 | Yamaguchi | 477/111 |
| 6,217,477 B1 * | 4/2001 | Nobumoto et al. | 477/43 |
| 2002/0132699 A1 * | 9/2002 | Bellinger | 477/107 |
| 2003/0203790 A1 * | 10/2003 | Matsubara et al. | 477/107 |

FOREIGN PATENT DOCUMENTS

| | | |
|---|---|---|
| JP | 2000-079829 A | 3/2000 |
| JP | 2003-199202 A | 7/2003 |
| JP | 2004-138030 A | 5/2004 |
| JP | 2006-009838 A | 1/2006 |
| JP | 2006-009942 A | 1/2006 |
| JP | 2006-062569 A | 3/2006 |
| JP | 2006-160238 A | 6/2006 |
| JP | 2007-237829 A | 9/2007 |
| RU | 2 233 011 C2 | 7/2004 |
| RU | 2 238 193 C2 | 10/2004 |

* cited by examiner

*Primary Examiner* — Roger Pang
(74) *Attorney, Agent, or Firm* — Kenyon & Kenyon LLP

(57) ABSTRACT

An ECU executes a program including a step of determining whether a manual shift mode is active or not, a step of calculating a lower limit revolution speed based on a vehicle speed and a gear selected by a driver when the manual shift mode is active, a step of changing a target idle revolution speed from a predetermined revolution speed to the lower limit revolution speed when a required engine torque is substantially zero and the engine is not in a fuel cut state, and a step of transmitting a control signal corresponding to the target idle revolution speed to the engine.

13 Claims, 9 Drawing Sheets

CONTROL DEVICE OF A VEHICLE, CONTROL METHOD AND RECORDING MEDIUM BEARING A PROGRAM IMPLEMENTING THE METHOD

This is a 371 national phase application of PCT/JP2007/074622 filed 17 Dec. 2007, claiming priority to Japanese Patent Application No. 2007-032193 filed 13 Feb. 2007, the contents of which are incorporated herein by reference.

TECHNICAL FIELD

The invention relates to control of a vehicle equipped with an internal combustion engine and a rotating electric machine, and particularly to control of a vehicle in which a driver can select a manual shift mode for gear shifting.

BACKGROUND ART

In recent years, attention has been given to hybrid vehicles as environmentally friendly vehicles. The hybrid vehicle is equipped with an electric motor as a drive power source for vehicle running in addition to a conventional internal combustion engine. Japanese Patent Laying-Open No. 2006-62569 has disclosed a technique that allows a driver to select a manual shift mode for gear shifting in this hybrid vehicle.

A shift device disclosed in Japanese Patent Laying-Open No, 2006-62569 controls the hybrid vehicle in which an engine, a first electric motor and a second electric motor connected to drive wheels are connected together via a planetary gear mechanism. This shift device includes a shift level to be operated for selecting a plurality of shift positions. This shift lever can be selectively shifted by a manual operation to a parking position, neutral position, forward automatic shift position (D position) and forward manual shift drive position (M position). In the M position, an up-shift position "+" and a down-shift-position "−" are aligned to each other in a longitudinal direction of the vehicle. When a driver shifts the shift lever to the up-shift position "+" or the downshift position "−", a "D" range or an "L" range is selected. Thereby, the shift control is performed so that a gear ratio may not exceed a ratio on a maximum speed side of the shift range.

In the hybrid vehicle disclosed in Japanese Patent Laying-Open No. 2006-62569, as described above, the revolution speeds of the engine and the first electric motor are controlled not to exceed the gear ratio on the maximum speed side during the running in the manual shift mode. However, even during the running in the manual shift mode, the engine may not attain the revolution speed corresponding to the gear ratio on the maximum speed side, but may be controlled to attain an idle revolution speed when the vehicle is in a self-sustained drive state, i.e., when the first electric motor is controlled to output a torque of substantially zero and the engine is controlled to stay in an idling state. Therefore, when a large difference is present between the revolution speed corresponding to the gear ratio on the maximum speed side and the idle revolution speed, the engine revolution speed changes rapidly to cause a shock in the vehicle whenever the state is switched between the non-self-sustained drive state and the self-sustained drive state.

DISCLOSURE OF THE INVENTION

The invention has been made for overcoming the above problem, and an object of the invention is to provide a control device of a vehicle that employs, as running sources, an internal combustion engine and a rotating electric machine connected to the internal combustion engine, and allows shifting in a manual shift mode, and particularly to provide a control device that can suppress a shock that may occur in the manual shift mode as well as a control method and a recording medium bearing a program achieving the method.

A control device controls a vehicle that has an internal combustion engine and a rotating electric machine connected to the internal combustion engine as running sources, and is configured to allow gear shifting in a shift mode selected from between an automatic shift mode and a manual shift mode by a driver. The control device includes a sensing unit sensing the shift mode selected from between the automatic shift mode and the manual shift mode by the driver; and a controller controlling the running sources to change an idle revolution speed of the internal combustion engine when the manual shift mode is selected, as compared with an idle revolution speed attained when the automatic shift mode is selected.

According to the invention, the driver selects the gear ratio during the running in the manual shift mode. Therefore, the revolution speed of the internal combustion engine is controlled to attain the revolution speed by the internal combustion engine and the rotating electric machine according to the gear ratio selected by the driver. However, depending on the state of the vehicle or the like (e.g., when the output torque of the rotating electric machine is controlled to be substantially zero and the internal combustion engine is in a self-sustained drive state and thus is controlled to stay in an idling state), such a situation may occur even during the running in the manual shift mode that the revolution speed is not controlled corresponding to the gear ratio selected by the driver, and is controlled only by the internal combustion engine to attain the idle revolution speed. In the manual shift mode, therefore, the revolution speed of the internal combustion engine may be switched from the revolution speed corresponding to the gear ratio selected by the driver to the idle revolution speed, and the revolution speed of the internal combustion engine may change to cause a shock in the vehicle. Accordingly, when the manual shift mode is selected, the idle revolution speed of the internal combustion engine is changed from that attained when the automatic shift mode is selected. For example, the revolution speed of the internal combustion engine is changed to the revolution speed according to the gear ratio selected by the driver. In the manual shift mode, therefore, the revolution speed of the internal combustion engine is stable, and the generation of the shock can be suppressed. Consequently, in the vehicle that has the internal combustion engine and the rotating electric machine connected to the internal combustion engine as the running sources, and is configured to allow the gear shifting in the manual shift mode, the control device can suppress the shock of the vehicle that may occur in the manual shift mode.

Preferably, the controller controls the running sources to increase the idle revolution speed when the manual shift mode is selected, as compared with the time when the automatic shift mode is selected.

According to the invention, when the manual shift mode is selected, the idle revolution speed increases. Thereby, the idle revolution speed increases, e.g., even when the revolution speed of the internal combustion engine is controlled to attain a high value in the manual shift mode. Therefore, the revolution speed of the internal combustion engine can stably keep a high value regardless of the state of the vehicle.

Further preferably, the control device includes a vehicle speed sensor sensing a vehicle speed; a gear sensing unit sensing a manual shift gear selected by the driver when the manual shift mode is selected; and a calculating unit calculating the lower limit revolution speed of the internal combustion engine based on the vehicle speed and the manual shift gear. The controller controls the running sources to change the idle revolution speed based on the lower limit revolution speed when the manual shift mode is selected.

According to the invention, when the manual shift mode is selected, the lower limit revolution speed of the internal combustion engine is calculated based on the vehicle speed and the manual shift gear. The idle revolution speed is changed based on the calculated lower limit revolution speed. Therefore, a difference between the lower limit revolution speed and the idle revolution speed can be small. Thereby, the revolution speed of the internal combustion engine can be kept stable even when the revolution speed of the internal combustion engine is switched from the state where it is controlled to attain the lower limit revolution speed to the state where it is controlled to attain the idle revolution speed.

Further preferably, the controller controls the running sources to change the idle revolution speed to a value corresponding to the lower limit revolution speed, when the manual shift mode is selected.

According to the invention, when the manual shift mode is selected, the idle revolution speed is changed to the value corresponding to the lower limit revolution speed. Therefore, the revolution speed of the internal combustion engine can be stably kept around the lower limit revolution speed.

BEST MODES FOR CARRYING OUT THE INVENTION

Embodiments of the invention will now be described with reference to the drawings. In the following description, the same portions bear the same reference numbers, and description thereof is not repeated.

Figure 1:
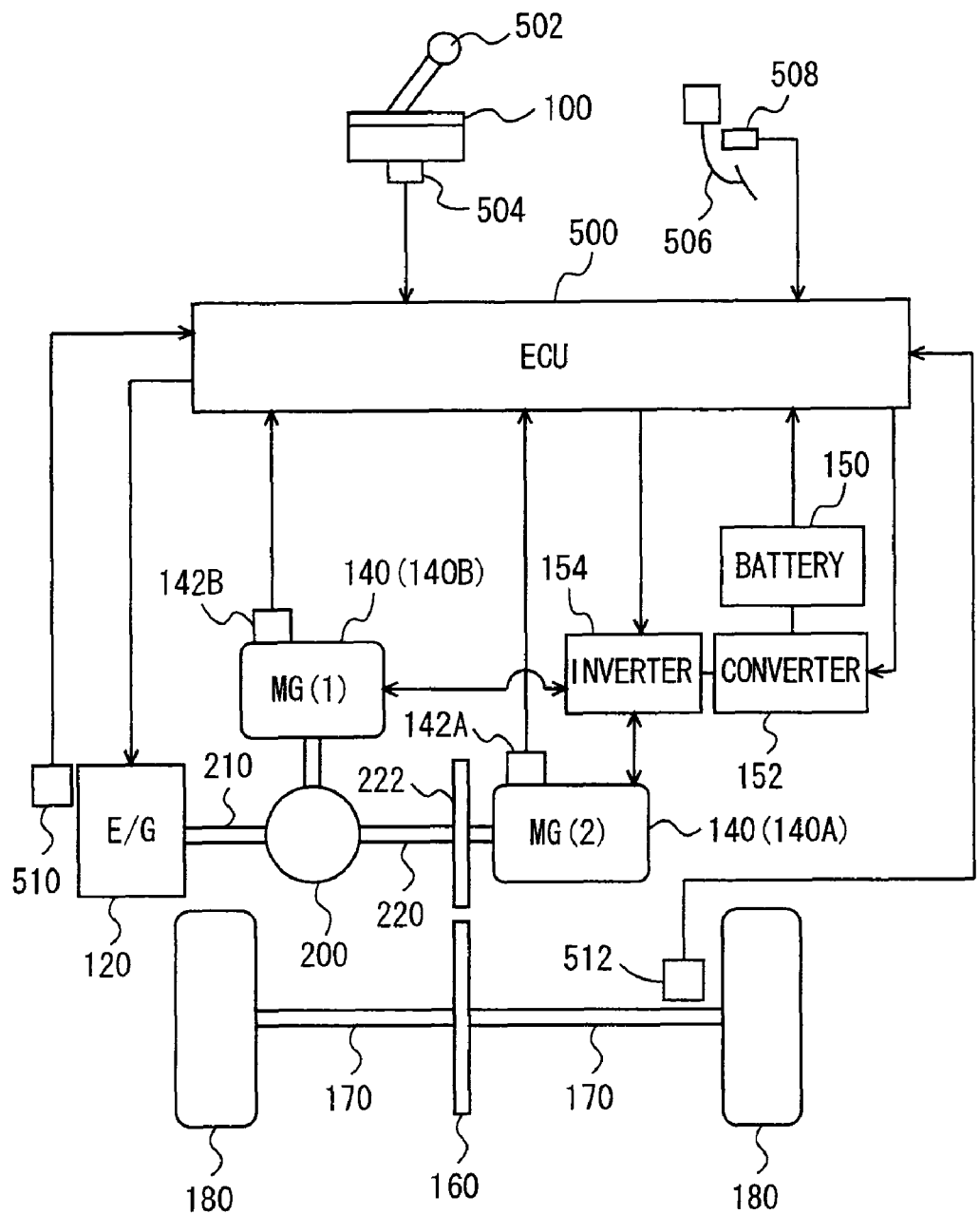
FIG. 1 shows a structure of a vehicle equipped with a control device according to an embodiment of the invention.

Referring to FIG. 1, description will be given on a control block diagram of an overall hybrid vehicle equipped with a control device according to the embodiment. The vehicle that can employ the control device according to the invention is not restricted to the hybrid vehicle shown in FIG. 1, and may be a hybrid vehicle of another form provided that it allows control of an engine revolution speed by an electric motor.

The hybrid vehicle includes an engine 120, a motor generator 140A (MG(2) 140A) and a motor generator 140B (MG(1) 140B). For the sake of illustration, MG(2) 140A and MG(1) 140B may be referred to as motor generators 140 when it is not necessary to discriminate between them.

Motor generator 140 can selectively function as a generator and an electric motor depending on a running state of the hybrid vehicle. A rotation shaft of motor generator 140 transmits a drive power via drive shafts 170 to drive wheels 180. The vehicle runs using the drive power provided from motor generator 140. When motor generator 140 functions as the generator, regenerative braking is performed. When motor generator 140 functions as the generator, kinetic energy of the vehicle is converted to electric energy and the vehicle decelerates.

In addition to the above components, the hybrid vehicle includes a reducer 160 for transmitting the drive power generated by engine 120 and motor generator 140 to drive wheels 180 and transmitting the drive of drive wheels 180 to engine 120 and motor generators 140, a power splitting mechanism 200 that has an input shaft 210 connected to a crank shaft of engine 120 and can distribute the drive power generated by engine 120 to two paths, i.e., drive wheels 180 and MG(1) 140B, a battery 150 storing an electric power for driving motor generator 140, an inverter 154 that performs current control by performing conversion between the DC of battery 150 and the AC of MG(2) 140A and MG(1) 140B, an ECU 500 controlling the overall hybrid system to achieve the most efficient running of the hybrid vehicle, and the others.

Inverter 154 operates motor generator 140 as an electric motor or a generator based on a control signal provided from ECU 500. For operating motor generator 140 as the motor, inverter 154 converts a DC power supplied from battery 150 to an AC power, and supplies it to motor generator 140. By controlling the electric power supplied to motor generator 140, inverter 154 controls motor generator 140 to attain the revolution speed and revolution direction requested by the control signal provided from ECU 500.

Further, a booster converter 152 is arranged between battery 150 and inverter 154. Since a rated voltage of battery 150 is lower than the rated voltages of MG(2) 140A and MG(1) 140B, booster converter 152 boosts the electric power of battery 150 when the power of battery 150 is to be supplied to MG(2) 140A and MG(1) 140B. When battery 150 is to be charged with the power generated by MG(2) 140A and MG(1) 140B, the booster converter steps down the electric power.

ECU 500 is connected via a harness and the like to resolver circuits 142A and 142B, a shift position sensor 504, an accelerator position sensor 508, an engine revolution speed sensor 510 and a vehicle speed sensor 512.

Resolver circuit 142A senses the revolution speed and revolution direction of MG(2) 140A, and transmits a signal indicating a result of the sensing to ECU 500.

Resolver circuit 142B senses the revolution speed and revolution direction of MG(1) 140B, and transmits a signal indicating a result of the sensing to ECU 500.

Shift position sensor 504 senses a position of a shift lever 502 that is movable along a shift path formed in a shift gate 100, and transmits a signal indicating a result of the sensing to ECU 500.

Accelerator position sensor 508 senses a position of an accelerator pedal 506 (i.e., accelerator position ACC), and transmits a signal indicating a result of the sensing to ECU 500.

Engine revolution speed sensor 510 senses a revolution speed (engine revolution speed NE) of the crankshaft that is the output shaft of engine 120, and transmits the signal indicating a result of the sensing to ECU 500.

Vehicle speed sensor 512 senses the revolution speed of drive shaft 170 as a vehicle speed V, and transmits a signal indicating a result of the sensing to ECU 500.

ECU 500 controls devices and the like to attain the desired running state of the vehicle based on signals sent from resolver circuits 142A and 142B, shift position sensor 504, accelerator position sensor 508, engine revolution speed sensor 510 and vehicle speed sensor 512 as well as maps and programs stored in a ROM (Read Only Memory).

Figure 2:
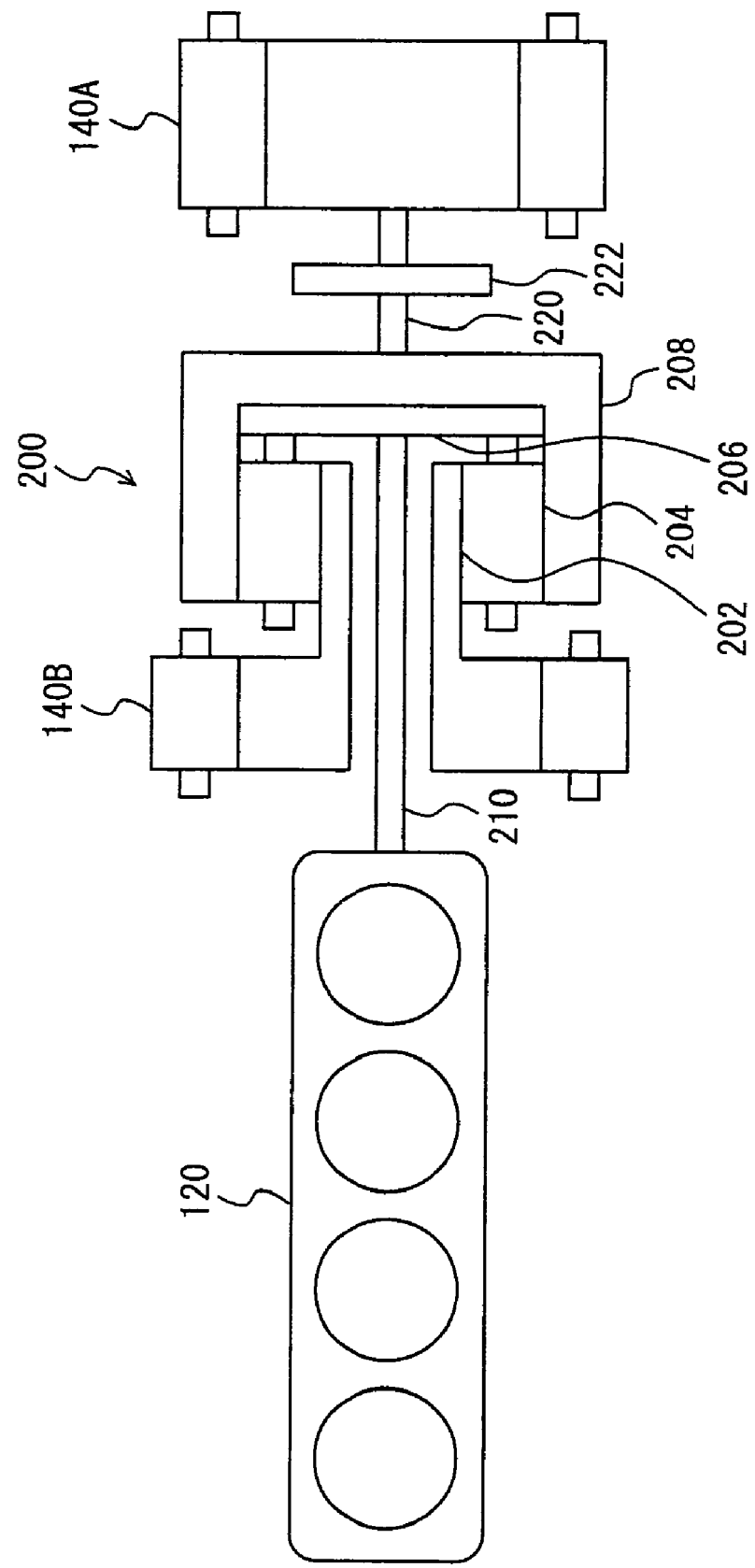
FIG. 2 shows a power splitting mechanism in FIG. 1.

Referring to FIG. 2, power splitting mechanism 200 will be further described below. Power splitting mechanism 200 is formed of a planetary gear including a sun gear (S) 202 which will be simply referred to as a "sun gear 202" hereinafter, pinion gears 204, a carrier (C) 206 which will be simply referred to as a "carrier 206" hereinafter) and a ring gear (R) 208 which will be simply referred to as a "ring gear 208" hereinafter).

Pinion gears 204 are engaged with sun gear 202 and ring gear 208. Carrier 206 rotatably carries pinion gears 204. Sun gear 202 is coupled to a rotation shaft of MG(1) 140B. Carrier 206 is coupled to the crank shaft of engine 120. Ring gear 208 is coupled to an output shaft 220.

Figure 3:
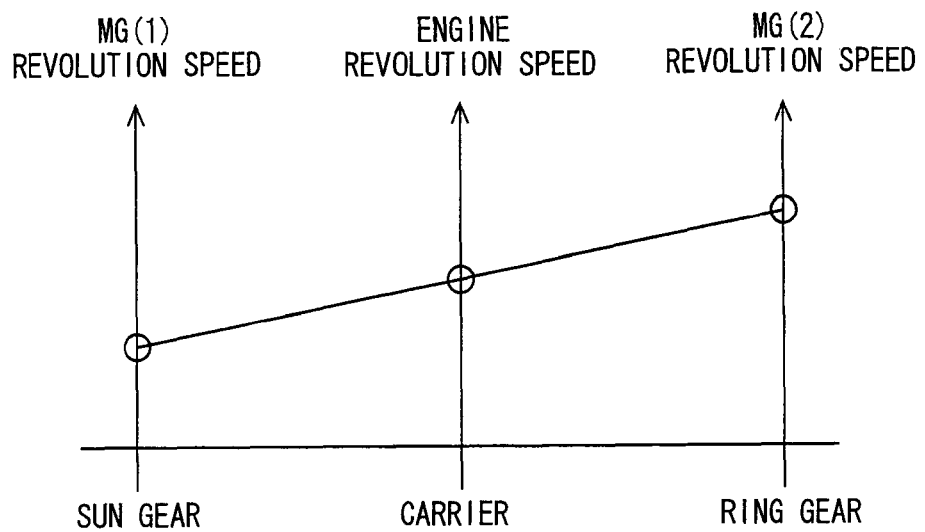
FIG. 3 is an alignment chart illustrating a relationship in revolution speed between an engine, MG(1) and MG(2).

Since engine 120, MG(1) 140B and MG(2) 140A are coupled via power splitting mechanism 200 formed of the planetary gear, the revolution speeds of engine 120, MG(1) 140B and MG(2) 140A exhibit a relationship represented by straight line in alignment chart, e.g., as shown in FIG. 3 (which represents an example of the relationship during stationary driving). By using this relationship, the revolution speed of MG(1) 140B can be adjusted to adjust engine revolution speed NE with respect to the revolution speed (i.e., vehicle speed V) of MG(2) 140A.

Figure 4:
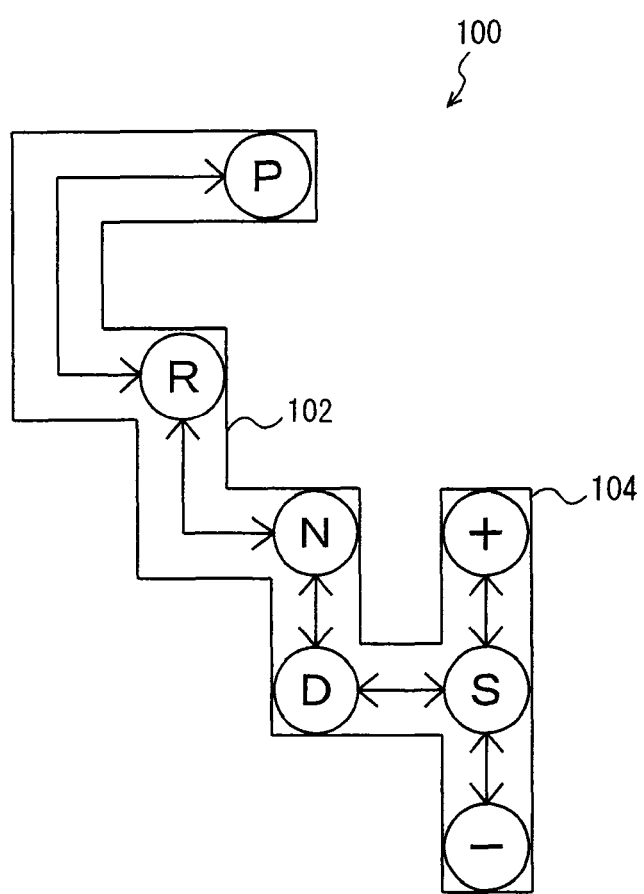
FIG. 4 shows a form of a shift gate according to the embodiment of the invention.

Referring to FIG. 4, shift gate 100 will be described below. As shown in FIG. 4, a shift path 102 is formed in shift gate 100. Shift lever 502 is movable along shift path 102. A plurality of shift positions are set in shift path 102. For example, the plurality of shift positions include a forward position (which will be referred to as a "(D) position" hereinafter), a neutral position (which will be referred to as an "(N) position"), a parking position (which will be referred to as a "(R) position") and a reverse position (which will be referred to as an "(R) position"). Shift gate 100 is configured such that shift lever 502 can move downward on the sheet of FIG. 4 from the position corresponding to the (P) position to the (R), (N) and (D) positions.

Further, shift path 102 is connected to a sub-gate 104. Shift path 102 is connected to a central portion of sub-gate 104, i.e., a central portion in a longitudinal direction on the sheet of FIG. 4. A shift position (which will be referred to as an (S) position hereinafter) is set in the central portion of sub-gate 104, and this (S) position corresponds to a manual shift mode in which the gear ratio is fixed to the value corresponding to the gear selected by the driver. When shift lever 502 is moved rightward on the sheet of FIG. 4 from the (D) position, it reaches the (S) position.

In sub-gate 104, when shift lever 502 moves upward on the sheet of FIG. 4 from the (S) position, it reaches a (+) position. When shift lever 502 moves downward on the sheet of FIG. 4 from the (S) position, it reaches a (−) position. The form of shift gate 100 is not restricted to the above. Shift gate 100 may be arranged near the driver's seat such that the upward direction on the sheet of FIG. 4 matches the forward direction of the vehicle. Also, shift gate 100 may be arranged near the driver's seat such that the upward direction on the sheet of FIG. 4 matches the upward direction of the vehicle.

The driver operates shift lever 502 along shift path 102 formed in shift gate 100 to move shift lever 502 to a desired position (shift position). By changing the position of shift lever 502, the driver can select the power transmitting state of power splitting mechanism 200.

When the driver moves shift lever 502 to the (D) position, shift position sensor 504 transmits a signal indicating the selection of the (D) position. When ECU 500 receives the signal indicating the selection of the (D) position from shift position sensor 504, it controls the vehicle in the automatic shift mode. More specifically, ECU 500 continuously changes the gear ratio (i.e., (revolution speed of input shaft 210)/(revolution speed of output shaft 220)) of power splitting mechanism 200 according to the state of the vehicle, and controls engine 120 and MG(1) 140B so that power splitting mechanism 200 may function as a continuously variable transmission.

When the driver moves shift lever 502 to the (S) position, shift position sensor 504 transmits a signal indicating the selection of the (S) position. When ECU 500 receives from shift position sensor 504 the signal indicating that the driver moved shift lever 502 from the (S) position to the (+) position (i.e., the driver performed an operation that may also be referred to as a "(+) operation"), ECU 500 shifts up the gear by one from the gear currently selected by the driver. When ECU 500 receives from shift position sensor 504 the signal indicating that the driver moved shift lever 502 from the (S) position to the (−) position(i.e., the driver performed an operation that may also be referred to as a "(−) operation"), ECU 500 shifts down the gear by one from the gear currently selected by the driver.

Figure 5:
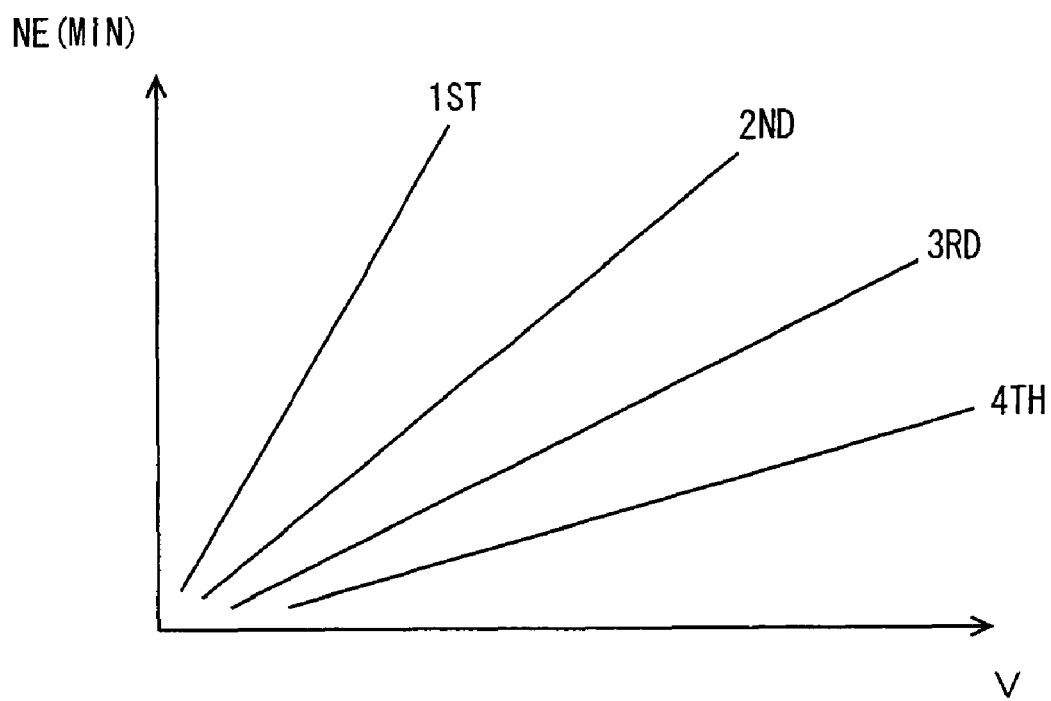
FIGS. 5 and 8 show relationships between a vehicle speed, a gear and a lower limit revolution speed of the engine.

When ECU 500 receives from shift position sensor 504 the signal indicating the selection of the (S) position, it controls the vehicle in the manual shift mode. More specifically, when the (S) position is selected and the vehicle enters the manual shift mode, ECU 500 sets a lower limit revolution speed NE(MIN) of engine revolution speed NE based on the map using vehicle speed V and the gear selected by the driver as parameters, as shown in FIG. 5. ECU 500 controls engine 120 and MG(1) 140B such that engine revolution speed NE does not lower below lower limit revolution speed NE(MIN). In the following description, a state in which both engine 120 and MG(1) 140B are outputting torques is referred to as a "load drive state". The vehicle control method in the manual shift mode is not restricted to this. For example, ECU 500 may control engine 120 and MG(1) 140B such that the gear ratio of power splitting mechanism 200 is limited according to the gear selected by the driver, and thereby power splitting mechanism 200 functions as a stepwise or discontinuously variable transmission.

When accelerator position ACC is substantially zero, ECU 500 cuts off fuel supply to engine 120 to keep engine 120 in a fuel cut state. In the fuel cut state, ECU 500 controls an output state of MG(1) 140B. In this embodiment, the "output state" represents the state in which ECU 500 transmits a motor control signal to inverter 154 so that the output torque of MG(1) 140B can be controlled.

When accelerator position ACC is not substantially zero and the output of engine 120 is not required (i.e., when required engine torque PE to be described later is substantially zero), ECU 500 keeps MG(1) 140B in the non-output state, and keeps engine 120 in the idling state. In this embodiment, the non-output state means a state in which the transmission of the motor control signal from ECU 500 to inverter 154 is interrupted, and the output torque of MG(1) 140B cannot be controlled. In the following description, when MG(1) 140B is controlled to stay in the non-output state and engine 120 is controlled to stay in the idling state, this state is also referred to as a "self-sustained drive state".

For controlling engine 120 to stay in the idling state, ECU 500 controls engine revolution speed NE to be equal to a predetermined target idle revolution speed NE(0). In the self-sustained drive state, engine revolution speed NE is controlled to be equal to the target idle revolution speed.

In the hybrid vehicle having the above structures, when the driver selects the manual shift mode and the vehicle is in the load drive state and the fuel cut state, the lower limit value of engine revolution speed NE is controlled to attain lower limit revolution speed NE(MIN). In the self-sustained drive state, engine revolution speed NE is controlled to be equal to target idle revolution speed NE(0). Therefore, when a large difference is present between lower limit revolution speed NE(MIN) and target idle revolution speed NE(0), engine revolution speed NE rapidly changes to cause an unexpected shock in the vehicle every time the load drive state and the fuel cut state change to the self-sustained drive state, and vice versa.

Accordingly, this embodiment changes the target value of engine revolution speed NE during the self-sustained drive state according to the shift mode and the state of MG(1) 140B, and particularly changes it from target idle revolution speed NE(0) to lower limit revolution speed NE(MIN).

Figure 6:
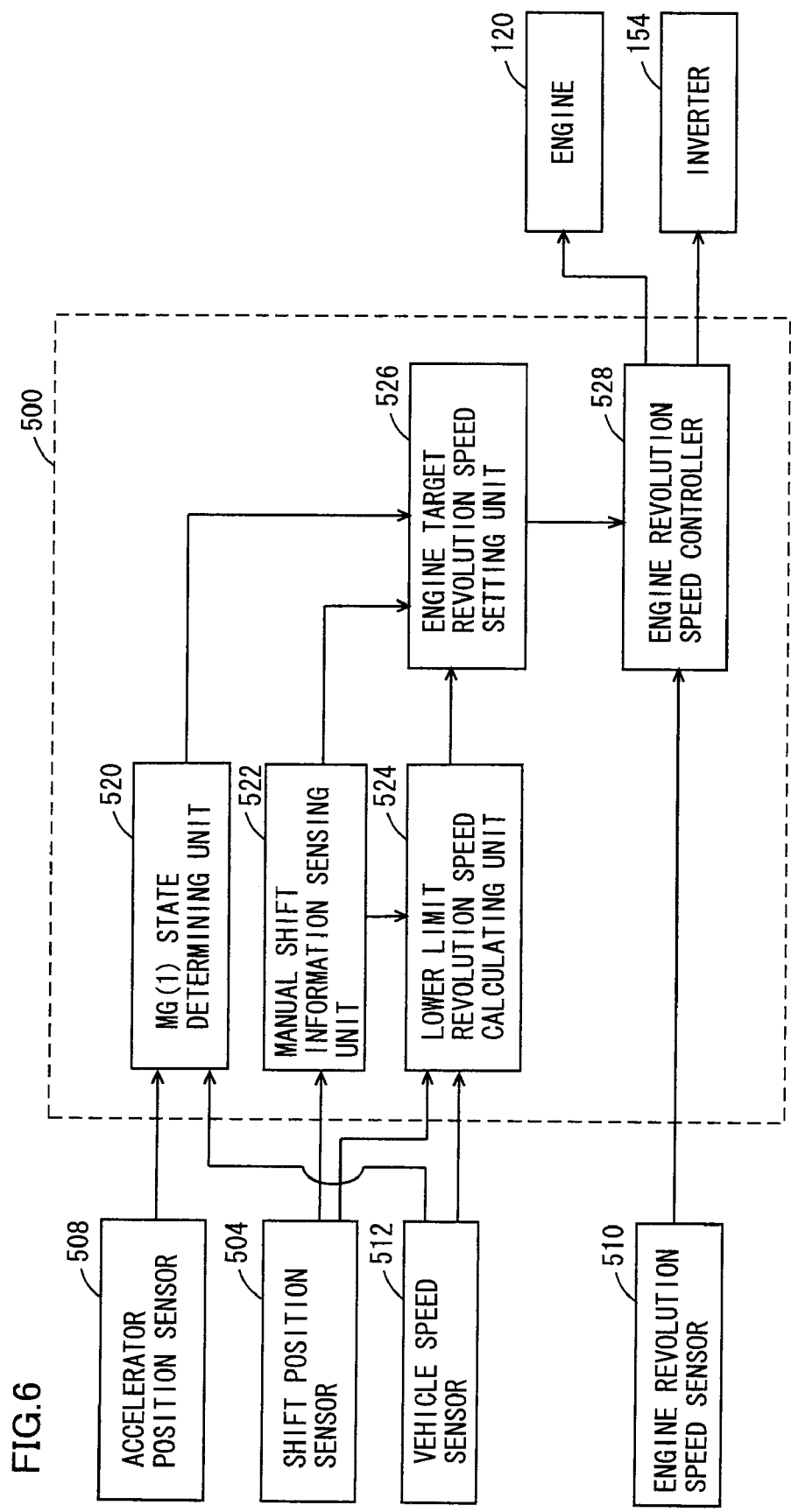
FIG. 6 is a functional block diagram of the control device according to the embodiment of the invention.

Referring to FIG. 6, a functional block diagram of the control device according to the embodiment will be described below. As shown in FIG. 6, this control device includes an MG(1) state determining unit 520, a manual shift information sensing unit 522, a lower limit revolution speed calculating unit 524, an engine target revolution speed setting unit 526 and an engine revolution speed controller 528.

MG(1) state determining unit 520 determines whether MG(1) 140B is in the output state or the non-output state, based on the signals provided from accelerator position sensor 508 and vehicle speed sensor 512.

Based on the signal provide from shift position sensor 504, manual shift information sensing unit 522 senses the fact that the driver has selected the manual shift mode, and also senses the gear that is selected by the driver.

Lower limit revolution speed calculating unit 524 calculates lower limit revolution speed NE(MIN) of engine 120 based on the signal provided from vehicle speed sensor 512 and shift position sensor 504.

Engine target revolution speed setting unit 526 sets the target revolution speed of engine 120 based on the signals provided from MG(1) state determining unit 520, manual shift information sensing unit 522 and lower limit revolution speed calculating unit 524.

Engine revolution speed controller 528 controls at least one of engine 120 and inverter 154 such that engine 120 runs at the target revolution speed set by engine target revolution speed setting unit 526.

The control device according to the embodiment that has the above functional blocks can be implemented either by hardware primarily formed of structures of digital and/or analog circuits, or by the CPU (Central Processing Unit) included in the ECU and the memory as well as software primarily formed of programs that are read from the memory for execution by the CPU. In general, it has been reported that the implementation by the hardware is advantageous in view of operation speed, and the implementation by the software is advantageous in view of changes in design. The following description will be given on the case where the control device is implemented by the software. A recording medium bearing such programs is also one of the forms of the invention.

Figure 7:
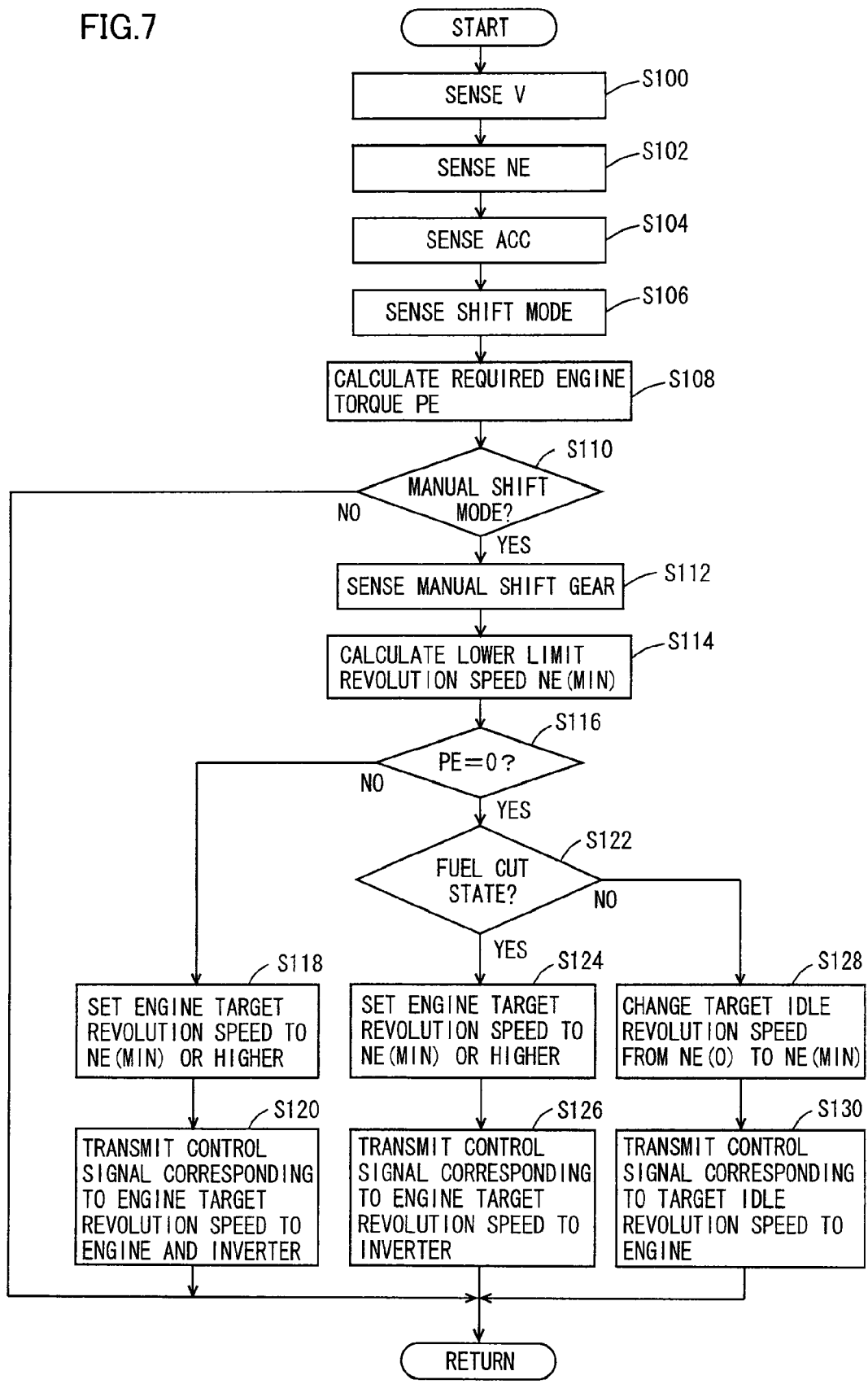
FIG. 7 is a flowchart illustrating a control structure of an ECU that is a control device according to the embodiment of the invention.

Referring to FIG. 7, description will now be given on a control structure of the program executed by ECU 500 that is the control device according to the embodiment. The execution of this program is repeated in a cycle of a predetermined time.

In step (which will be abbreviated as "S" hereinafter) 100, ECU 500 detects vehicle speed V based on the signal from vehicle speed sensor 512.

In S102, ECU 500 senses engine revolution speed NE based on the signal from engine revolution speed sensor 510.

In S104, ECU 500 senses accelerator position ACC based on the signal from accelerator position sensor 508.

In S106, ECU 500 senses the shift mode selected by the driver, based on the signal from shift position sensor 504.

Figure 8:
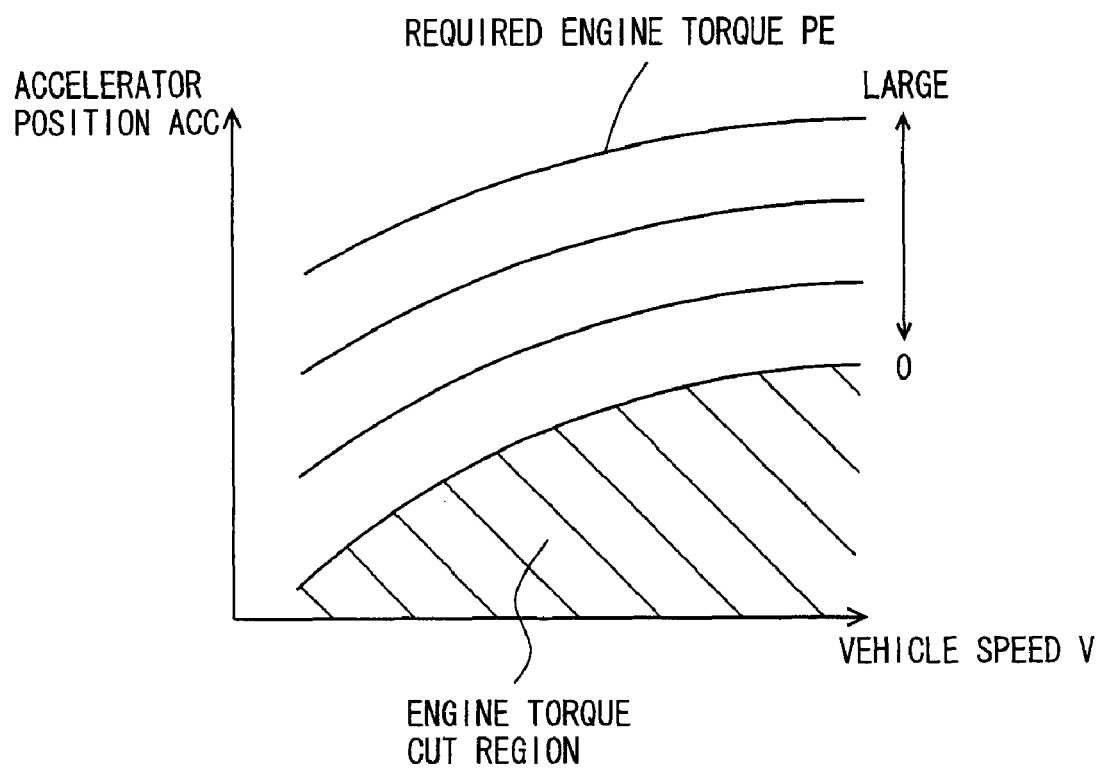

In S108, ECU 500 calculates required engine torque PE based on vehicle speed V and accelerator position ACC. For example, ECU 500 calculates required engine torque PE based on the map using vehicle speed V and accelerator position ACC as parameters, as shown in FIG. 8. In the map shown in FIG. 8, the abscissa gives vehicle speed V, the ordinate gives accelerator position ACC and required engine torque PE is calculated from the region containing intersection points of vehicle speed V and accelerator position ACC. When an engine torque cut region contains the intersection point of vehicle speed V and accelerator position ACC, required engine torque PE calculated by ECU 500 is substantially zero even when accelerator position ACC is not substantially zero. The manner of calculating required engine torque PE is not restricted to the above.

In S110, ECU 500 determines whether the sensed shift mode is the manual shift mode or not. When it is the manual shift mode (YES in S110), the process proceeds to S112. Otherwise (NO in S110), this processing ends.

In S112, ECU 500 senses the gear selected by the driver, based on the signal from shift position sensor 504.

In S114, ECU 500 calculates lower limit revolution speed NE(MIN) based on vehicle speed V and the gear. ECU 500 calculates lower limit revolution speed NE(MIN) based on the map (see FIG. 5) that uses vehicle speed V and the gear as the parameters. The manner of calculating lower limit revolution speed NE(MIN) is not restricted to the above.

In S116, ECU 500 determines whether required engine torque PE is substantially zero or not. When required engine torque PE is substantially zero (YES in S116), the process proceeds to S122. Otherwise (NO in S116), the process proceeds to S118.

In S118, ECU 500 sets the engine target revolution speed equal to or higher than lower limit revolution speed NE(MIN).

In S120, ECU 500 transmits the control signal corresponding to the engine target revolution speed to engine 120 and inverter 154.

In S122, ECU 500 determines whether the vehicle is in the fuel cut state or not. For example, when accelerator position ACC is substantially zero, ECU 500 determines that the fuel cut is being performed. When the vehicle is in the fuel cut state (YES in S122), the process proceeds to S124. Otherwise (NO in S122), the process proceeds to S128.

In S124, ECU 500 sets the engine target revolution speed to lower limit revolution speed NE(MIN) or more.

In S126, ECU 500 transmits the control signal corresponding to the engine target revolution speed to inverter 154.

In S128, ECU 500 changes the target idle revolution speed from predetermined revolution speed NE(0) to lower limit revolution speed NE(MIN).

In S130, ECU 500 transmits the control signal corresponding to the target idle revolution speed to engine 120.

Based on the structures and flow chart described above, ECU 500, i.e., the control device according to the embodiment controls the operation of the vehicle as described below.

Figure 9:
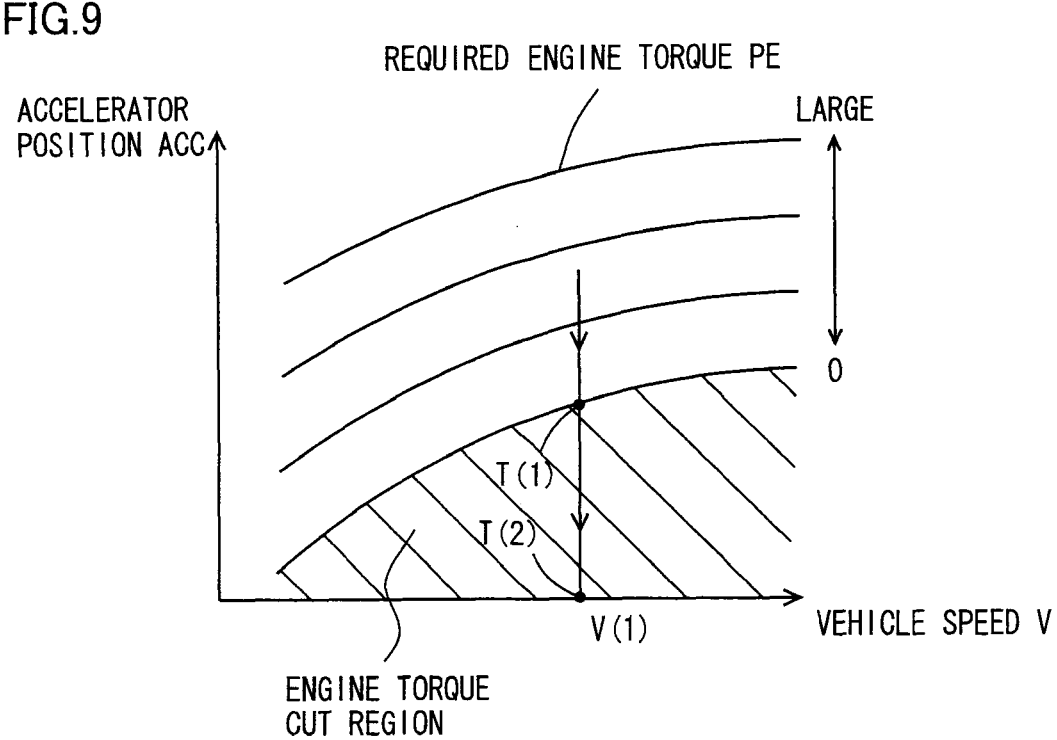
FIGS. 9 and 10 show relationships between the vehicle speed, an accelerator position and a required engine torque.

It is assumed that the driver has selected the second gear in the manual shift mode, accelerator position ACC lowers during running at vehicle speed V(1) as shown in FIG. 9, required engine torque PE becomes substantially zero at a time T(1) and thereafter accelerator position ACC will become substantially zero at a later time T(2).

Figure 10:
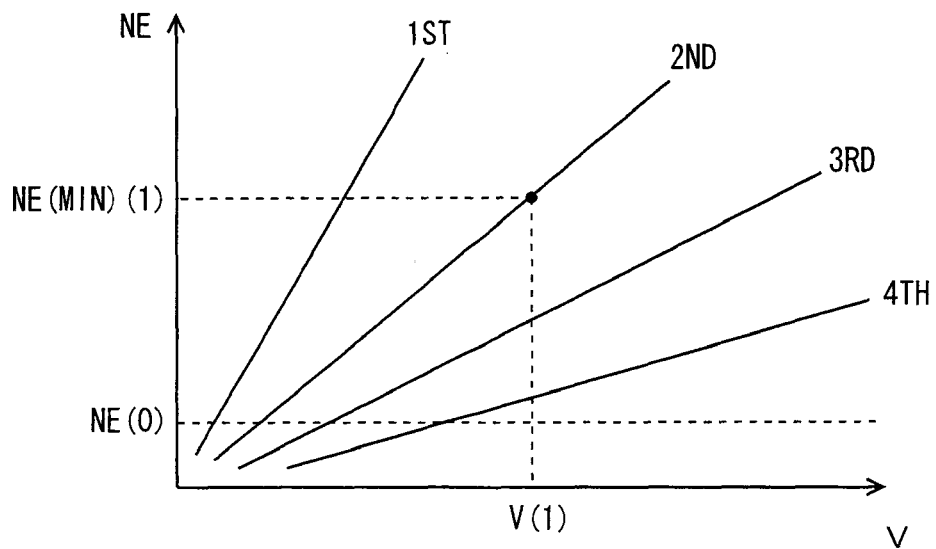

Vehicle speed V(1), engine revolution speed NE and accelerator position ACC are sensed (S110, S102 and S104), and required engine torque PE is calculated (S108). Since the vehicle is in the manual shift mode (YES in S110), the second gear that is the gear selected by the driver is sensed (S112), and vehicle speed V(1) and lower limit revolution speed NE(MIN)(1) corresponding to the second gear are calculated (S114) as shown in FIG. 10.

Figure 11:
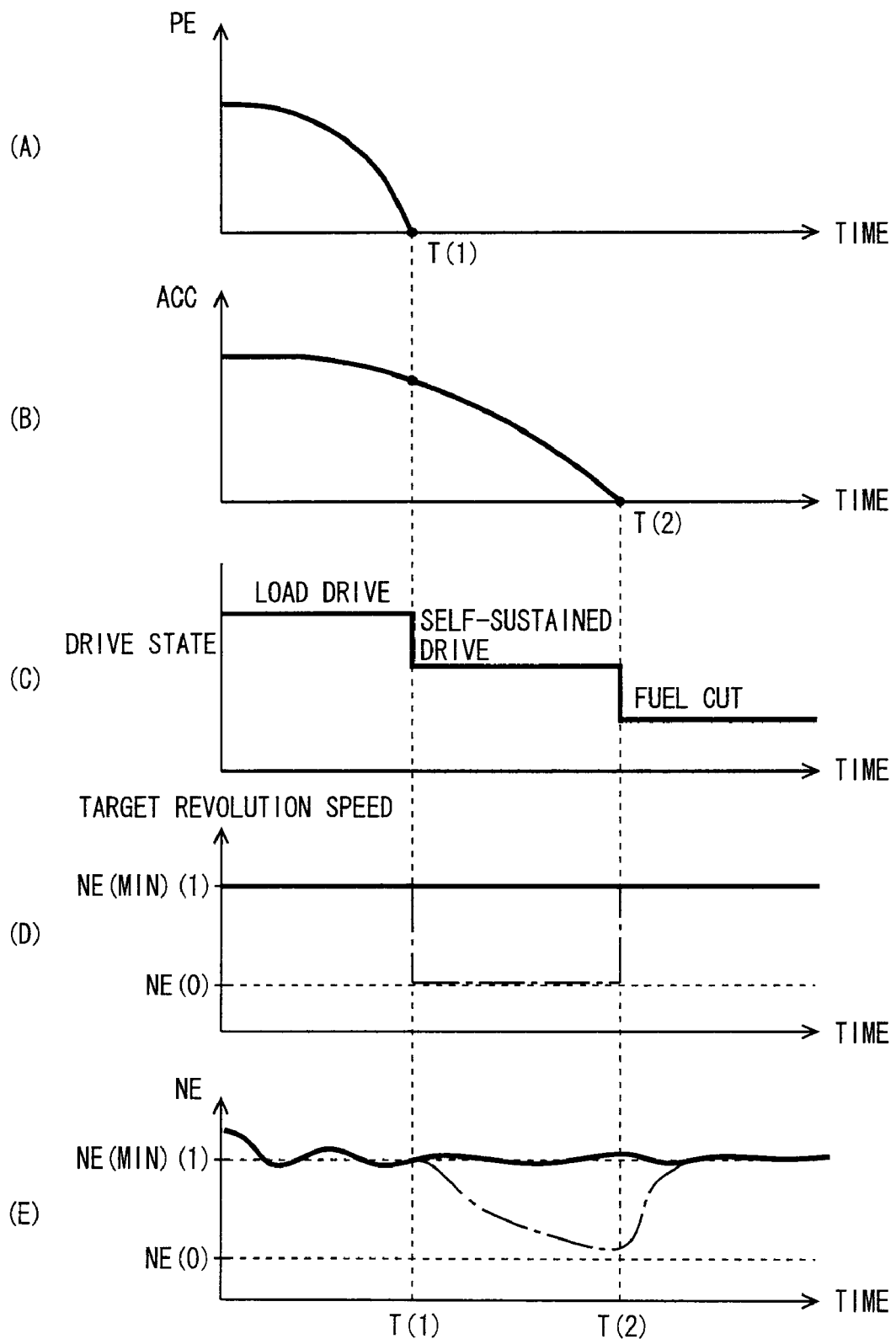
FIG. 11 is a timing chart illustrating an operation of the vehicle equipped with the control device according to the embodiment of the invention.

Before time T(1), required engine torque PE is not substantially zero (NO in S116), the vehicle is in the load drive state as shown in FIG. 11(C). Therefore, the engine target revolution speed is set to NE(MIN)(1) as shown in FIG. 11(D) in S118, and, and engine 120 and MG(1) 140B are controlled such that the lower limit value of engine revolution speed NE becomes equal to NE(MIN)(1) as shown in FIG. 11(E).

At time T(1), required engine torque PE is substantially zero (YES in S116), accelerator position ACC is neither substantially zero nor in the fuel cut state (NO in S122) so that the vehicle enters the self-sustained drive state as shown in FIG. 11(C).

In the above state, when the engine target revolution speed is set to target idle revolution speed NE(0) (see alternate long and short dash line), a large difference occurs between NE(MIN)(1) and NE(0) so that engine revolution speed NE rapidly rises to cause a shock as shown by alternate long and short dash line in FIG. 11(E).

Accordingly, during the self-sustained driving (YES in S116 and NO in S122), the target idle revolution speed changes from NE(0) to NE(MIN)(1) in S128 as shown in FIG. 11(D), and engine 120 is controlled in S130 such that engine revolution speed NE becomes equal to NE(MIN)(1) as shown in FIG. 11(E). Thereby, even when the drive state is switched from the load drive state to the self-sustained drive state, engine revolution speed NE can be controlled to stay continuously around NE(MIN)(1). Therefore, engine revolution speed NE is stable, and the generation of the shock can be suppressed.

At a time (T2), required engine torque PE is substantially zero (YES in S116) and accelerator position ACC is substantially zero so that the engine enters the fuel cut state (YES in S122) as shown in FIG. 11(C). Therefore, as shown in FIG. 11(D), engine target revolution speed is set to NE(MIN)(1) in S124, and MG(1) 140B is controlled such that engine revolution speed NE becomes equal to NE(MIN)(1) as shown in FIG. 11(E) in S126. Thereby, even when the state changes from the self-sustained drive state to the fuel cut state, engine revolution speed NE can be controlled to stay continuously around NE(MIN)(1). Therefore, engine revolution speed NE is stable, and the generation of the shock can be suppressed.

According to the control device of the embodiment, as described above, when the driver selects the manual shift mode, the target revolution speed during the idling of the engine changes from the predetermined revolution speed to the lower limit revolution speed in the manual shift mode. Therefore, even when the switching from the load drive state and the fuel cut state to the self-sustained drive state and vice versa takes place during the running in the manual shift mode, the engine revolution speed can be stably kept at the lower limit revolution speed in the manual shift mode so that the generation of the shock can be suppressed.

Although the present invention has been described and illustrated in detail, it is clearly understood that the same is by way of illustration and example only and is not to be taken by way of limitation, the scope of the present invention being interpreted by the terms of the appended claims.

The invention claimed is:

1. A control device of a vehicle having an internal combustion engine and a rotating electric machine connected to said internal combustion engine as running sources, and being configured to allow gear shifting in a shift mode selected from between an automatic shift mode and a manual shift mode by a driver, comprising:
  a sensing unit that senses the shift mode selected from between said automatic shift mode and said manual shift mode by the driver; and
  a controller that controls said running sources to change an idle revolution speed of said internal combustion engine when said manual shift mode is selected, as compared with an idle revolution speed attained when said automatic shift mode is selected.

2. The control device according to claim 1, wherein
  said controller controls said running sources to increase said idle revolution speed when said manual shift mode is selected, as compared with an idle revolution speed attained when said automatic shift mode is selected.

3. The control device according to claim 1, further comprising:
  a vehicle speed sensor that senses a vehicle speed;
  a gear sensing unit that senses a manual shift gear selected by said driver when said manual shift mode is selected; and
  a calculating unit that calculates the lower limit revolution speed of said internal combustion engine based on said vehicle speed and said manual shift gear, wherein
  said controller controls said running sources to change said idle revolution speed based on said lower limit revolution speed when said manual shift mode is selected.

4. The control device according to claim 3, wherein
  said controller controls said running sources to change said idle revolution speed to a value corresponding to said lower limit revolution speed, when said manual shift mode is selected.

5. A control device of a vehicle having an internal combustion engine and a rotating electric machine connected to said internal combustion engine as running sources, and being configured to allow gear shifting in a shift mode selected from between an automatic shift mode and a manual shift mode by a driver, comprising:
  means for sensing the shift mode selected from between said automatic shift mode and said manual shift mode by the driver; and
  control means for controlling said running sources to change an idle revolution speed of said internal combustion engine when said manual shift mode is selected, as compared with an idle revolution speed attained when said automatic shift mode is selected.

6. The control device according to claim 5, wherein
  said controller includes means for controlling said running sources to increase said idle revolution speed when said manual shift mode is selected, as compared with an idle revolution speed attained when said automatic shift mode is selected.

7. The control device according to claim 5, further comprising:
  means for sensing a vehicle speed;
  means for sensing a manual shift gear selected by said driver when said manual shift mode is selected; and
  means for calculating the lower limit revolution speed of said internal combustion engine based on said vehicle speed and said manual shift gear, wherein said control means includes means for controlling said running sources to change said idle revolution speed based on said lower limit revolution speed when said manual shift mode is selected.

8. The control device according to claim 7, wherein said control means controls said running sources to change said idle revolution speed to a value corresponding to said lower limit revolution speed, when said manual shift mode is selected.

9. A control method of a vehicle having an internal combustion engine and a rotating electric machine connected to said internal combustion engine as running sources, and being configured to allow gear shifting in a shift mode selected from between an automatic shift mode and a manual shift mode by a driver, comprising:
   a step of sensing the shift mode selected from between said automatic shift mode and said manual shift mode by the driver; and
   a control step of controlling said running sources to change an idle revolution speed of said internal combustion engine when said manual shift mode is selected, as compared with an idle revolution speed attained when said automatic shift mode is selected.

10. The control method according to claim 9, wherein said control step includes a step of controlling said running sources to increase said idle revolution speed when said manual shift mode is selected, as compared with an idle revolution speed attained when said automatic shift mode is selected.

11. The control method according to claim 9, further comprising:
   a step of sensing a vehicle speed;
   a step of sensing a manual shift gear selected by said driver when said manual shift mode is selected; and
   a step of calculating the lower limit revolution speed of said internal combustion engine based on said vehicle speed and said manual shift gear, wherein
   said control step includes a step of controlling said running sources to change said idle revolution speed based on said lower limit revolution speed when said manual shift mode is selected.

12. The control method according to claim 11, wherein said control step includes a step of controlling said running sources to change said idle revolution speed to a value corresponding to said lower limit revolution speed, when said manual shift mode is selected.

13. A recording medium computer-readably bearing a program for causing a computer to execute the control method according to claim 9.

* * * * *